United States Patent [19]

Addeo et al.

[11] Patent Number: 5,387,452
[45] Date of Patent: Feb. 7, 1995

[54] PROCESS FOR PREPARING THERMOINSULATING AND/OR STRUCTURAL DOUBLE-WALLED MOLDED BODIES AND PRODUCTS THEREBY OBTAINED

[75] Inventors: Antonio Addeo, Novara; Annibale Vezzoli, Como, both of Italy

[73] Assignee: Centro Sviluppon Settori Impiego, Milan, Italy

[21] Appl. No.: 171,652

[22] Filed: Dec. 22, 1993

Related U.S. Application Data

[62] Division of Ser. No. 904,832, Jun. 26, 1992, Pat. No. 5,308,557.

[30] Foreign Application Priority Data

Jun. 28, 1991 [IT] Italy .................. MI91A001797

[51] Int. Cl.⁶ .................................................. B32B 5/18
[52] U.S. Cl. .......................................... 428/71; 428/76
[58] Field of Search .................. 428/71, 76; 264/28, 264/321

[56] References Cited

U.S. PATENT DOCUMENTS 5,308,557 5/1994 Addeo et al. .

Primary Examiner—James C. Cannon
Attorney, Agent, or Firm—Bryan Cave

[57] ABSTRACT

A process for preparing thermoinsulating and/or structural double-walled molded bodies, which comprises the following steps:
 (a) heating two sheets made of thermoplastic polymer to a temperature equal or slightly higher than their softening point;
 (b) inserting between the two sheets a pre-mold made of an expanded polymeric material;
 (c) thermoforming in a mold the two sheets on the pre-mold;
 (d) soldering together the two sheets on their rims by means of a pressure applied on them by the mold.

3 Claims, 2 Drawing Sheets

PROCESS FOR PREPARING THERMOINSULATING AND/OR STRUCTURAL DOUBLE-WALLED MOLDED BODIES AND PRODUCTS THEREBY OBTAINED

This is a divisional, of U.S. application Ser. No. 07/904,832, filed Jun. 26, 1992, now U.S. Pat. No. 5,308,557.

BACKGROUND OF THE INVENTION

This invention relates to a process for preparing thermoinsulating and/or structural double-walled molded bodies and to the products thereby obtained.

More particularly, it relates to a process for preparing thermoinsulating and/or structural double-walled molded bodies by thermoforming two thermoplastic sheets on an expanded polymeric preform.

The process of the present invention does not employ blowing agents of chlorofluorocarbon nature.

With the term "molded body", as utilized in the present description and in the claims, it is intended whatever structural element, rigid, circular or polygonal, to be employed in the field of transports, household electric appliances, buildings, cars, telecommunications, office machines, etc.

Examples of suitable applications are doors, covers, frameworks particularly for refrigerators, freezer, panels, containers for portable thermic bags.

At present, the above mentioned molded articles are usually obtained starting from two half-shells which are mechanically assembled by soldering or sticking and afterwards the hollow part enclosed between the two half-shells is filled with expanded polyurethane.

According to another technique, an hollow case of a thermoplastic polymer is prepared by blow molding and is the filled with an expanded polyurethane mixture.

The expanded polyurethane employed as insulating material in both the above described techniques is obtained from a formulation constituted by an organic diisocyanate, a polyol, a siliconic surfactant, a polymerization catalyst and a blowing agent of chlorofluorocarbon nature.

At present, the use of expanded polyurethane as a thermoinsulating material presents ecological problems since it has been asserted that blowing agents of chlorofluorocarbon nature are one of the principal causes of the alteration and distruction of the ozone layer in the atmosphere.

However, the substitution of polyurethane with an equivalent material is a problem of difficult solution since by means of this polymer, expanded in situ with the well known R.I.M. (Reaction Injection Molding) technique, rigid self-carrying structural elements can be obtained, even though the outer case is made of thermoplastic polymer and not of metallic sheet.

This is due to the fact that polyurethane, reacting in situ, adheres perfectly to the inner walls of the case, thus forming with it a single structural body.

SUMMARY OF THE INVENTION

It has now been found a process by means of which thermoinsulating and/or structural elements can be obtained employing expanded thermoplastic materials which do not request the use of chlorofluorocarbons as blowing agents and which present, with respect to known products, at least the same insulating properties at the same thickness. Moreover with the above process elements are obtained which can be recycled integrally.

DETAILED DESCRIPTION OF THE INVENTION

Figures 1, 2, 3, 4:
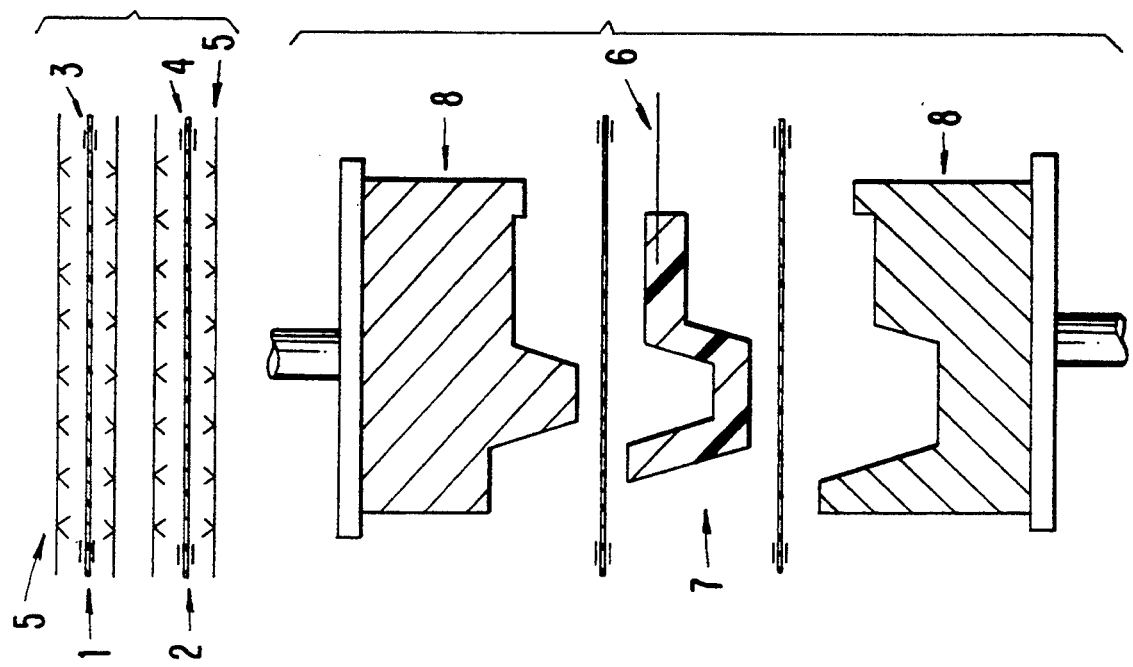
FIG. 1 is a sectional view of the two thermoplastic polymer sheets before being softened by heating.
FIG. 2 is a sectional view of the two heated thermoplastic polymer sheets being positioned between a level concave pre-mold and a mold.
FIG. 3 is a sectional view of the molding of the thermoinsulating molded body.
FIG. 4 is a sectional view of the thermoinsulating molded body resulting from the steps shown in FIGS. 1-3.
Figure 5:
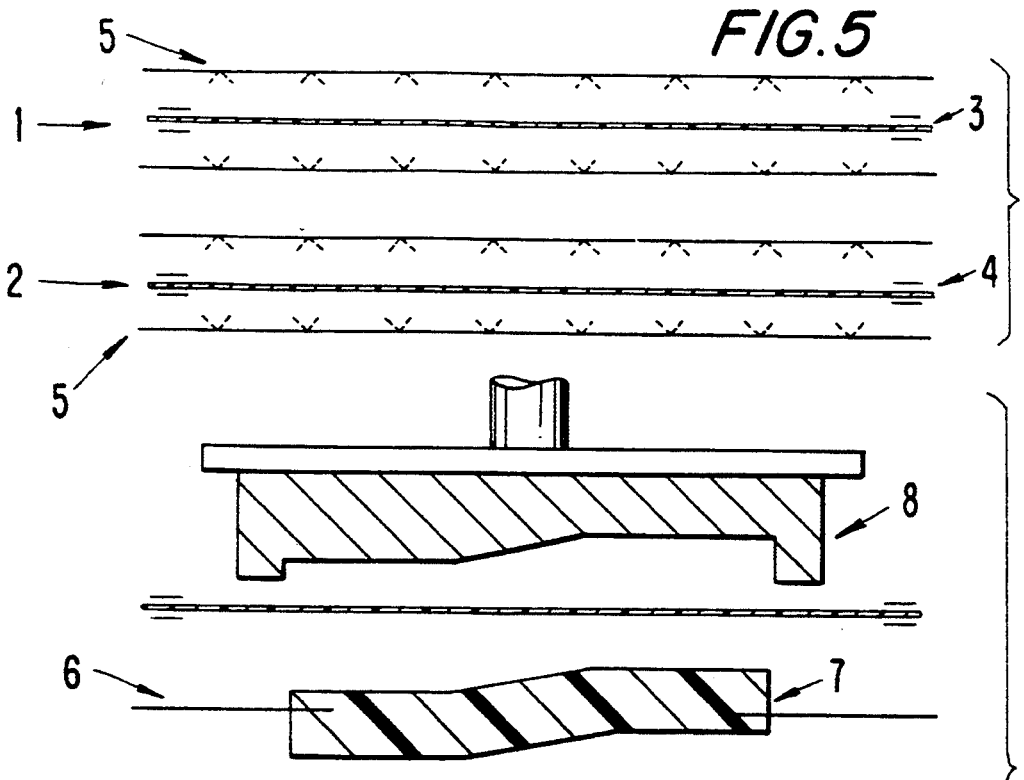
FIG. 5 is a sectional view of the two thermoplastic polymer sheets before being softened by heating.
Figure 6:
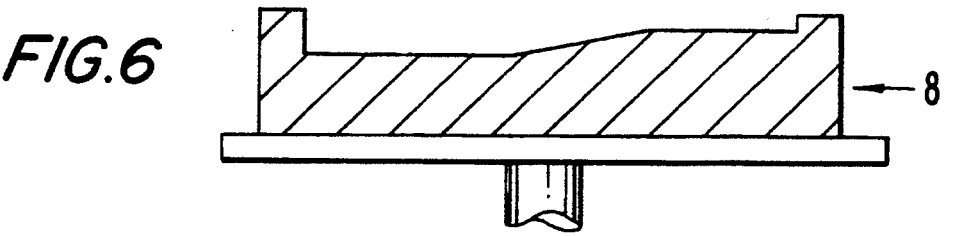
FIG. 6 is a sectional view of the two heated thermoplastic polymer sheets being positioned between a level convex pre-mold and a mold.
Figure 7:
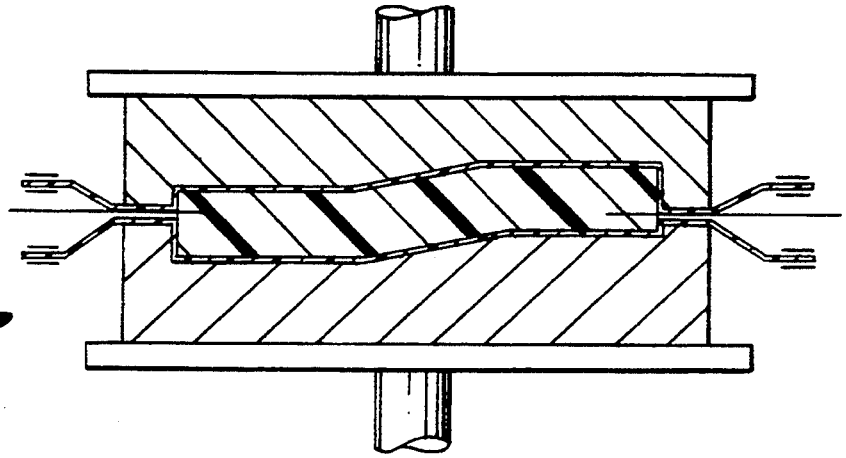
FIG. 7 is a sectional view of the molding of the thermoinsulating molded body.
Figure 8:
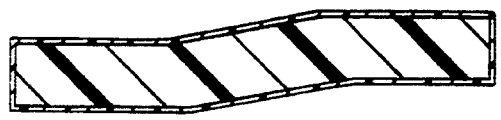
FIG. 8 is a sectional view of the thermoinsulating molded body resulting from the steps shown in FIGS. 5-7.

The process for preparing of thermoinsulating and/or structural double-walled molded bodies according to the present invention comprises the following steps:

(a) heating two sheets made of thermoplastic polymer to a temperature equal or slightly higher than their softening point;

(b) inserting between the two sheets a pre-mold made of an expanded polymeric material;

(c) thermoforming in a mold the two sheets on the pre-mold;

(d) soldering together the two sheets on their rims by means of a pressure applied on them by the mold.

Any expanded thermoinsulating polymer is suitable to be used as a constituent of the expanded pre-mold. Preferred polymers are expanded polystyrol, expanded shock-resistant polystyrol, expanded polypropylene and expanded shock-resistant polypropylene.

No particular limitation exists for the thermoplastic sheets which are thermoformed on the pre-mold, save that they are made of thermoplastic polymer.

Preferably the thermoplastic sheets and the pre-mold are made of the same polymer.

Examples of said polymers are polystyrol, shock-resistant polystyrol, polystyrol modified with polar monomers such as acrylonitril, styrenic alloys such as ABS, SAN, etc., polyvinylchloride, high, medium, low density polyethylene, polypropylene, shock-resistant polypropylene, ethylene/propylene copolymers, acrylic and/or methaacrylic resins, polymethacrylates, polyester resins such as PET, PBT.

Preferred polymers are polystyrol, shock-resistance polystyrol, styrenic alloys, polypropylene and shock-resistance polypropylene.

The two thermoplastic sheets, each of them having average thickness ranging from 0,5 to 20 mm, are heated to a temperature close to their softening point by means of known perature close to their softening point by means of known techniques, for instance by infra-red radiation or by electrically heated plates.

The choice of said temperature depends on the employed polymer and is generally higher than 100° C., preferably ranging from 120° to 200° C.

The termoforming of the thermoplastic sheets can be performed by means of different techniques, depending on the thickness of the article to be thermoformed.

For instance, vacuum can be applied in the mold or, in the alternative, an excess pressure of air can be introduced in the mold from the vacuum holes in order to improve the adhesion between the expanded polymer and the thermoplastic sheets.

In both the above described techniques the thermoplastic sheets are heated at a temperature close or slightly higher than their softening point, so that during the thermoforming they perfectly adhere and are heat-welded to the pre-mold and form with it a single thermoinsulating rigid structural body.

According to another aspect, the present invention relates to the thermoinsulating and/or structural molded bodies obtainable by means of the above described process.

A non-limitative embodiment of the instant process is described, by way of example, in the accompanying drawings.

The operation of the process according to the present invention results apparent from the drawing and from the above description.

The two thermoplastic sheets 1 and 2, located on special bearing hinges 3 and 4, are separately heated to a predetermined temperature, generally higher than the softening point of the polymer, by means of traditional heaters 5.

The two thermoplastic sheets may be of the same chemical composition, but they must be sufficiently compatible with the expanded pre-mold in order to achieve the desired adhesion degree on the pre-mold and on each other without the use of adhesives. At the end of the heating step the two sheets are pneumatically transported in the molding zone, where the expanded pre-mold 7 is positioned between the above sheets by means of suitable supports 6.

The molding of the sheets on the expanded pre-mold is performed by closing the two half 8 of the mold and slightly pressing the sheets on the pre-mold.

The soldering of the two sheets on the rims is achieved with the pressure applied on them by the two half-molds.

As the thermoplastic sheets are at a temperature of thermoplastic working, when thermoformed they perfectly adhere to the pre-mold 7 soldering on it and on each other on their rims, thus forming a single thermoinsulating rigid structural body.

In order to assure an optimal adhesion of the sheets on the pre-mold, in the molding step vacuum is applied in the two half of the mold and then, after closing the mold compressed air (2–4 bars) is introduced.

The invention is further illustrated by the following examples.

EXAMPLE 1

Two polystyrene sheets having a size of 600 mm×500 mm and a thickness of 1.0 mm, obtained by extrusion, were placed on two bearing hinges of a thermomolding machine, made by the company Triulzi, which has a thermomolding plane of 2,000×1,000 mm available.

The polystyrene used in the two sheets was Edistir SRL 600, made by the company Enichem Polimeri.

A pre-mold made of an expanded polystyrene material, obtained by bead-sintering molding technology, was placed between the two above-mentioned sheets. The polystyrene used in the manufacturing of the expanded pre-mold was Extir A 3000, made by the company Enichem Polimeri.

The sintered expanded pre-mold, having a size of 500×400×40 mm and a density of 35 kg/m$^3$, had been stored in a refrigerating room at −20° C. for two hours before being placed between the two sheets for thermoforming. This pretreatment reduces the breakdown of the outer part of the expanded pre-mold when it comes into contact with the polystyrene sheets heated during the thermoforming process.

After positioning, the two thermoplastic sheets were heated using two infrared radiating ceramic panels, one for each sheet, having a heating power of 1.4 watt/cm$^2$ and placed at a distance of 200 mm from the sheets to be heated. The heating time was 30 seconds, which enabled the sheets to reach a temperature of 170° C.

Molding of the sheets on the expanded pre-mold was carried out by closing the two half-molds and slightly pressing the sheets on the pre-mold.

In order to obtain optimum thermomolding, the sizes of the molds were 3 mm larger in comparison with those of the pre-mold only in the surface zone, corresponding to a shrinkage of 0.6%.

Soldering of the sheets on the rims was achieved with the pressure applied on them by the two half-molds.

In order to assure an optimal adhesion of the sheets on the pre-mold, vacuum (40 mm Hg) was applied in the molding step and compressed air (4 bars) was subsequently introduced.

The resulting product was a structural body, 500×400×40 mm in size, having an outer layer of solid polystyrene about 1 mm thick and a core of expanded polystyrene having the same density as that of the expanded pre-mold (35 kg/m$^3$).

EXAMPLE 2

Two polypropylene sheets having a size of 600 mm×500 mm and a thickness of 1.0 mm, obtained by extrusion, were placed on two bearing hinges of the thermomolding machine used in the previous example.

The polypropylene for the two thermoplastic sheets was Moplen EPQ30RF, made by Himont.

A pre-mold made of an expanded polypropylene material, obtained by bead-sintering molding technology, was placed between the two above-mentioned sheets. The polypropylene used in the manufacturing of the expanded beads for the sintering of the mold was Profax PF 814, made by Himont.

The expanded pre-mold, having a size of 495×396×40 mm and a density of 35 kg/m$^3$, had been stored at −5° C. for two hours before being placed between the two sheets for thermoforming. The refrigerating room was the same as in the previous example.

In the heating of the polypropylene sheets the same radiating panels as used in the previous example were used. The heating time was 45 seconds, to permit the sheets to reach a temperature of 180° C.

Molding of the sheets on the expanded pre-mold was carried out in the same way as the previous example.

The resulting product was a structural body, 500×400×40 mm in size, having an outer layer of solid polystyrene about 1 mm thick and a core of expanded polystyrene having the same density as that of the expanded pre-mold (35 kg/m$^3$).

When practicing the present invention, it is possible to change, modify or alter the different parts of the process described in the herewith enclosed drawing which is given for illustrative but not limiting purpose.

What is claimed is:

1. A thermoinsulating and/or structural molded body, which comprises an inner thermoplastic expanded pre-mold thermosoldered between two sheets of thermoplastic polymer thermoformed on said expanded pre-mold after the premold had been cooled in a refrigerated environment.

2. A thermoinsulating and/or structural molded body according to claim 1, wherein the inner expanded pre-mold and the sheets are made of a material selected in the group consisting of polystyrol, shock-resistant polystyrol, polypropylene and shock-resistant polypropylene.

3. A thermoinsulating and/or structural molded body according to claim 1, wherein each of the two sheets has average thickness ranging from 0,5 to 20 mm.

* * * * *

UNITED STATES PATENT AND TRADEMARK OFFICE
CERTIFICATE OF CORRECTION

PATENT NO. : 5,387,452

DATED : February 7, 1995

INVENTOR(S): Addeo, et al.

It is certified that error appears in the above-identified patent and that said Letters Patent is hereby corrected as shown below:

Column 6, line 11
In claim 3, line 3 Change "0,5" to -- 0.5 --

Signed and Sealed this

Sixteenth Day of May, 1995

*Attest:*

BRUCE LEHMAN

*Attesting Officer*     *Commissioner of Patents and Trademarks*